United States Patent
Kwon et al.

(10) Patent No.: US 8,121,630 B2
(45) Date of Patent: Feb. 21, 2012

(54) DEVICE TO SENSE FREQUENCY BAND TO SHARE OPERATING FREQUENCY BANDS IN HETEROGENEOUS COMMUNICATION SYSTEMS AND METHOD THEREOF

(75) Inventors: Tae Soo Kwon, Hwaseong-si (KR); Woong Sup Lee, Daejeon (KR); Kyung Hun Jang, Suwon-si (KR); Hyo Sun Hwang, Seoul (KR); Dong Ho Cho, Seoul (KR); Ho Won Lee, Chungju-si (KR); O Hyun Jo, Cheongju-si (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 401 days.

(21) Appl. No.: 12/422,693

(22) Filed: Apr. 13, 2009

(65) Prior Publication Data

US 2009/0274081 A1 Nov. 5, 2009

(30) Foreign Application Priority Data

Apr. 30, 2008 (KR) .................. 10-2008-0040826
Oct. 23, 2008 (KR) .................. 10-2008-0104285

(51) Int. Cl.
*H04B 7/00* (2006.01)
(52) U.S. Cl. ........................... 455/522; 455/509
(58) Field of Classification Search ............ 455/62, 455/63.1, 63.3, 67.13, 522, 509; 370/329–330
See application file for complete search history.

(56) References Cited

U.S. PATENT DOCUMENTS

| | | | | |
|---|---|---|---|---|
| 7,610,036 | B2 * | 10/2009 | Teo et al. | 455/403 |
| 7,917,110 | B2 * | 3/2011 | Horiguchi et al. | 455/164.1 |
| 7,970,430 | B2 * | 6/2011 | Backof et al. | 455/550.1 |
| 7,979,076 | B2 * | 7/2011 | Hui et al. | 455/450 |

FOREIGN PATENT DOCUMENTS

| | | |
|---|---|---|
| JP | 2007-053546 | 3/2007 |
| KR | 10-2007-0048535 | 5/2007 |
| KR | 10-2007-0082039 | 8/2007 |
| KR | 10-2007-0089514 | 8/2007 |
| WO | WO 2007/096823 | 8/2007 |

* cited by examiner

*Primary Examiner* — Brian Young
(74) *Attorney, Agent, or Firm* — NSIP Law

(57) ABSTRACT

A cognitive radio communication device and method are provided. The cognitive radio communication device includes a reception unit to receive reference signals from a first communication device, a frequency division unit to divide operating frequency bands of the first communication device into a plurality of sub frequency bands, a first sensing unit to sense each of the plurality of sub frequency bands using the reference signals to estimate whether the first communication device uses each of the plurality of sub frequency bands, and to determine an unused frequency band group including at least one sub frequency band not used by the first communication device based on the estimated result, and a transmission unit to transmit data to a second communication device using the sub frequency band included in the unused frequency band group.

19 Claims, 11 Drawing Sheets

DEVICE TO SENSE FREQUENCY BAND TO SHARE OPERATING FREQUENCY BANDS IN HETEROGENEOUS COMMUNICATION SYSTEMS AND METHOD THEREOF

CROSS-REFERENCE TO RELATED APPLICATIONS

This application claims the benefit under 35 U.S.C. §119 (a) of Korean Patent Application Nos. 10-2008-0040826, filed on Apr. 30, 2008, and 10-2008-0104285, filed on Oct. 23, 2008, in the Korean Intellectual Property Office, the entire disclosures of which are incorporated herein by reference.

BACKGROUND

1. Field

The following description relates to a cognitive radio communication device and method, and more particularly, to a cognitive radio communication device and method for determining whether operating frequency bands are used in heterogeneous communication systems.

2. Description of the Related Art

With an increase in demand for high-speed and high-quality communication services, radio resources that may be available in the communication services are becoming exhausted. While frequency resources are limited, communication services using the frequency resources are on the rise. Accordingly, a cognitive radio communication system is being studied to more effectively use the radio resources.

A cognitive radio communication system may be a system that performs communication using an identical frequency band to a frequency band used by a heterogeneous radio communication system. To address a potential collision between the heterogeneous radio communication system and the cognitive radio communication system, the cognitive radio communication system may determine whether a specific frequency band is being used by the heterogeneous radio communication system, and use the specific frequency band in response to the specific frequency band not being used by the heterogeneous radio communication system.

That is, it may be desirable to determine whether the specific frequency band is used by the heterogeneous radio communication system, and accordingly, there is a need for a technique to sense the specific frequency band.

However, in order to determine whether the specific frequency band is used by the heterogeneous radio communication system, the cognitive radio communication system may not use the specific frequency band. For example, the cognitive radio communication system may determine whether the specific frequency band is being used by the heterogeneous radio communication system only when the cognitive radio communication system also does not use the specific frequency band.

Accordingly, communication of a cognitive radio communication device may be interrupted in order to determine whether the specific frequency band is being used by the heterogeneous radio communication system. As a result, frequency efficiency of the cognitive radio communication system may be deteriorated, and performance of data transmission may be reduced.

SUMMARY

In one general aspect, there is provided a cognitive radio communication device and method that simultaneously performs frequency sensing and data transmission, so as to effectively utilize the limited frequency resources.

According to another aspect, there is provided a cognitive radio communication device, including a reception unit to receive reference signals from a first communication device, a frequency division unit to divide operating frequency bands of the first communication device into a plurality of sub frequency bands, a first sensing unit to sense each of the plurality of sub frequency bands using the reference signals to estimate whether the first communication device uses each of the plurality of sub frequency bands, and to determine an unused frequency band group including at least one sub frequency band not used by the first communication device based on the estimated result, and a transmission unit to transmit data to a second communication device using the sub frequency band included in the unused frequency band group.

The first sensing unit may include an energy calculation unit to calculate an energy of the reference signals with respect to each of the plurality of sub frequency bands, and a threshold energy comparison unit to compare the calculated energy with a predetermined threshold value, wherein the first sensing unit estimates whether the first communication device uses each of the plurality of sub frequency bands based on the compared result.

A sub frequency band adjacent to the sub frequency band may be used by the first communication device is excluded from the unused frequency band group.

The reception unit may receive radio environment information associated with the first communication device, and the frequency division unit may divide the operating frequency bands based on the radio environment information.

The data may include a plurality of sub data having different priority from each another, and the transmission unit may transmit the data based on the priority of the plurality of sub data.

The transmission unit may transmit information about the unused frequency band group to the second communication device, and the reception unit may receive, from the second communication device, data transmitted based on the information about the unused frequency band group.

The cognitive radio communication device may further include a second sensing unit to compare a pattern of the reference signals with a predetermined pilot pattern to re-sense the sub frequency band not included in the unused frequency band group, and to enable the sub frequency band not used by the first communication device to be included in the unused frequency band group based on the re-sensed result.

According to still another aspect, there is provided a cognitive radio communication method, including receiving reference signals from a first communication device, dividing operating frequency bands of the first communication device into a plurality of sub frequency bands, sensing each of the plurality of sub frequency bands based on the reference signals, estimating whether the first communication device uses each of the plurality of sub frequency bands based on the sensed result, determining an unused frequency band group including at least one sub frequency band not used by the first communication device, and transmitting data to a second communication device using the sub frequency band included in the unused frequency band group.

The sensing may include calculating an energy level of the reference signals with respect to each of the plurality of sub frequency bands, and comparing the calculated energy with a predetermined threshold value.

The cognitive radio communication method may further include receiving radio environment information associated with the first communication device, wherein the dividing divides the operating frequency bands based on the radio environment information.

The data may include a plurality of sub data having different priority from each another, and the transmitting may transmit the data based on the priority of the plurality of sub data.

According to yet another aspect, there is provided a cognitive radio communication base station, the base station including a sensing terminal selection unit to select a sensing terminal to sense operating frequency bands of a primary communication device from among a plurality of terminals connected with the cognitive radio communication base station based on reference signals received from the primary communication device, a reception unit to receive a sensed result with respect to the operating frequency bands from the sensing terminal, and a transmission unit to transmit data to the sensing terminal using the operating frequency bands based on the sensed result.

The cognitive radio communication base station may further include a used frequency band measuring unit to measure a frequency band utilized by the primary communication device using the reference signals, wherein the sensing terminal selection unit compares a bandwidth of the used frequency band with a bandwidth of the operating frequency band, and selects the sensing terminal based on the compared result.

The sensing terminal selection unit may select, as the sensing terminal, terminals located in a specific area of a signal coverage radius of the cognitive radio communication base station.

The reception unit may receive, from a reference signal sensing terminal included in the plurality of terminals, a sensed result with respect to the reference signals, and the sensing terminal selection unit may select the sensing terminal based on a ratio of a number of the reference signal sensing terminals to a number of the plurality of terminals.

The sensing terminal selection unit may select the sensing terminal based on power supply types of each of the plurality of terminals.

According to yet another aspect, there is provided a cognitive radio communication terminal connected with a cognitive radio communication base station, the cognitive radio communication terminal including a transmission unit to transmit a power supply type of the cognitive radio communication terminal to a cognitive radio communication device, a reception unit to receive information about a sensing terminal selected based on the power supply type, and a reference signal sensing unit to sense reference signals received from a primary communication device based on the information about the sensing terminal, wherein the transmission unit transmits data to the cognitive radio communication base station based on a sensed result of the reference signal.

The reference signal sensing unit may estimate a used frequency band used by the primary communication device from among the operating frequency bands of the primary communication device based on the reference signals, and the transmission unit may transmit the data using a frequency band excluded from the used frequency band from among the operating frequency bands.

Other features and aspects will be apparent from the following detailed description, the drawings, and the claims.

Figure 1:
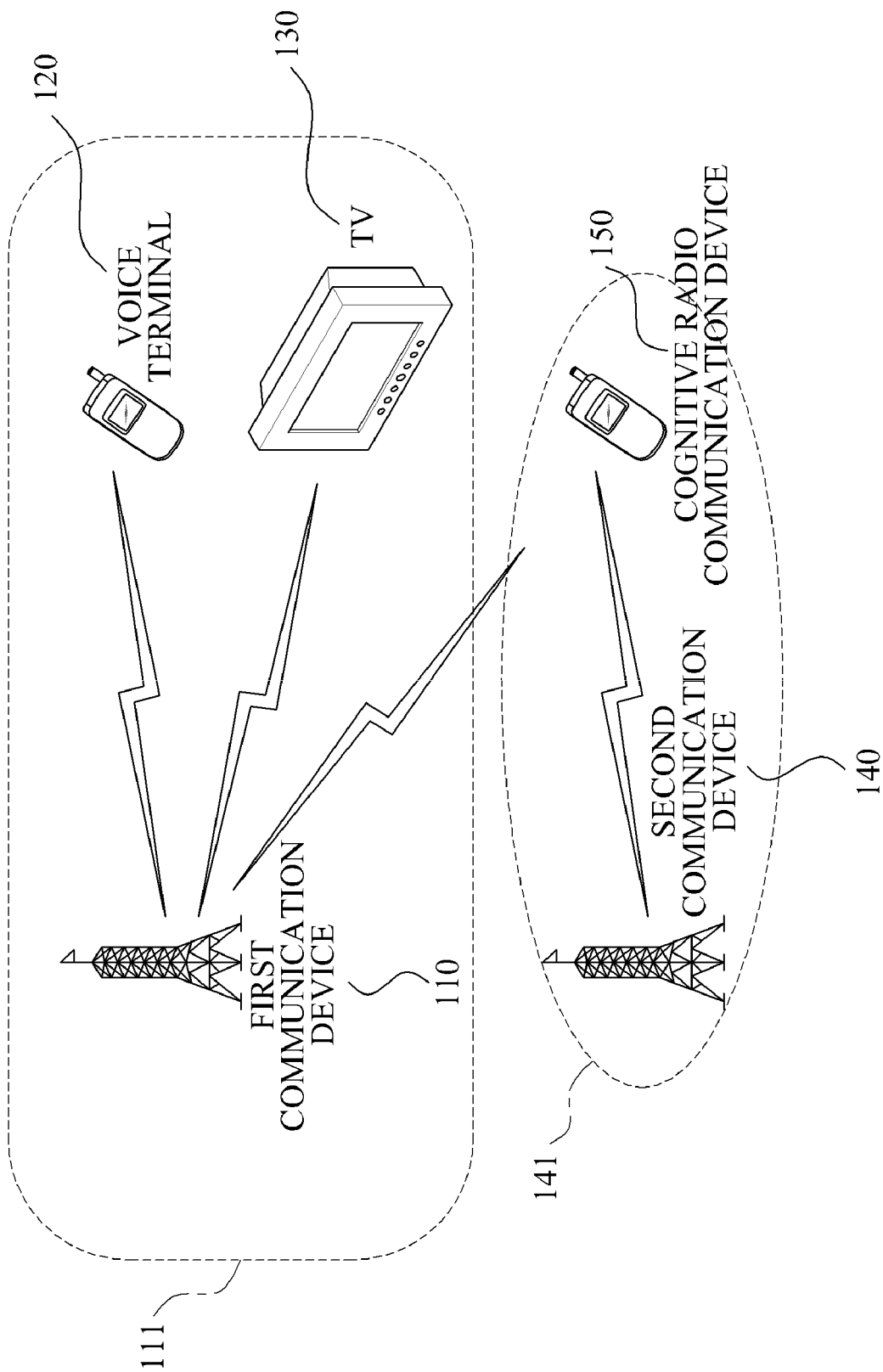
FIG. 1 is a configuration diagram illustrating an exemplary cognitive radio communication system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIG. 1 illustrates an exemplary cognitive radio communication system.

As illustrated in FIG. 1, a first communication system 111 includes a first communication device 110 and a voice terminal 120 and/or a television 130. A second communication system 141 includes a second communication device 140 and a cognitive radio communication device 150.

Each of the first communication system 111 and the second communication system 141 may transmit data using frequency bands which are overlapped with each other. Where different communication systems use an identical frequency band, data transmitted by each of the different communication systems may collide with each other, and thus no data may be accurately received.

The first communication device 110, the voice terminal 120, and the like may emit and/or receive radio waves to transmit and/or receive data. However, referring to FIG. 1, for an illustrative purpose only, it is assumed that the first communication device 110 emits radio waves to transmit data, and the voice terminal 120 or the television 130 receives the emitted radio waves.

The second communication system 141 may estimate whether the first communication device 110 emits radio waves within an operating frequency band, and may also determine whether the first communication system 111 uses a corresponding frequency band.

The second communication system 141 may estimate whether the first communication system 111 operates within the operating frequency band, and may transmit data only where the first communication system 111 operates within the corresponding frequency band.

The cognitive radio communication device 150 may receive reference signals transmitted from the first communication device 110, and determine the frequency band used by the first communication device 110 based on the received reference signals. The cognitive radio communication device 150 may transmit data to the second communication device 140 using a frequency band not used by the first communication device 110 from among the operating frequency bands.

Where the first communication system 111 transmits first data within only a portion of the entire frequency bands, the second communication system 141 may transmit second data within a frequency band not used by the first communication system 111, or may sense frequency bands, thereby effectively utilizing the operating frequency bands.

Although only the first communication system 111 and the second communication system 141 are illustrated in FIG. 1, a third communication system may be included to also operate within the operating frequency bands of the first communication system 111 and the second communication system 141. Accordingly, the first communication system 111 may be a broadband communication system to transmit data within all of the operating frequency bands, and the third communication system may be a narrowband communication system to transmit data within only a portion of the operating frequency bands. For example the first communication system 111 may be a television transmission network to transmit image signals of the broadband, and the third communication system may be a mobile communication network to transmit voice signals of the narrowband.

Referring to FIG. 1, the second communication device 140 may sense the operating frequency bands to estimate whether all of the operating frequency bands are used by the first communication system 110, or whether a portion of the operating frequency bands is used by the third communication system. Where all of the operating frequency bands are used by the first communication system 110, the second communication system 140 may wait until data transmission of the first communication system 110 is terminated while not transmitting data. Where a portion of the operating frequency bands is used by the third communication system, the second communication system 140 may transmit data using a frequency band not used by the third communication system.

Where a plurality of communication systems sharing the operating frequency bands are simultaneously present, the cognitive radio communication system may transmit data using frequency bands not used by heterogeneous communication systems, so that data transmitted by each of the plurality of communication systems do not collide or avoid colliding with each other.

Figure 2:
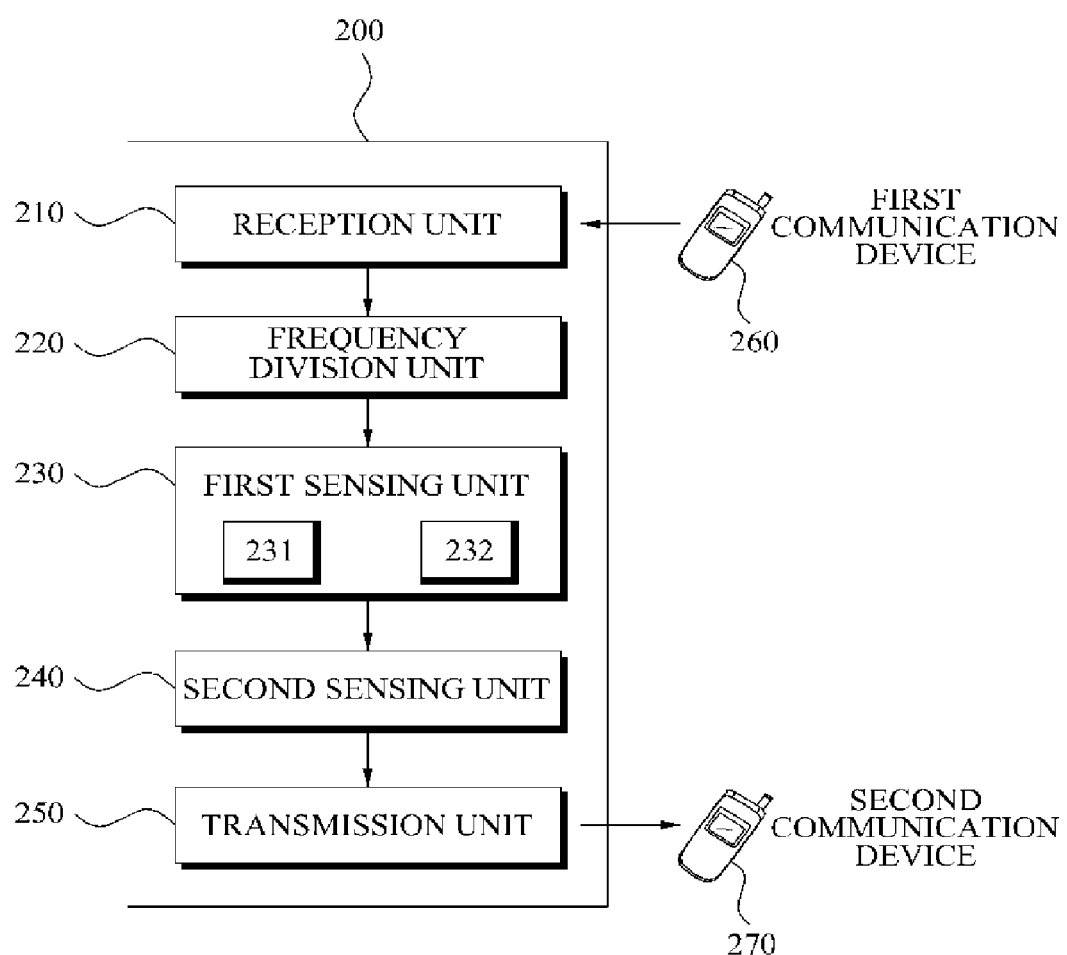
FIG. 2 is a block diagram illustrating an exemplary structure of a cognitive radio communication device.

FIG. 2 illustrates a structure of an exemplary cognitive radio communication device 200. The cognitive radio communication device 200 includes a reception unit 210, a frequency division unit 220, a first sensing unit 230, a second sensing unit 240, and a transmission unit 250.

The reception unit 210 may receive reference signals from a first communication device 260. The reference signals may be signals within operating frequency bands used by the first communication device 260 to transmit data.

The frequency division unit 220 may divide the operating frequency bands of the first communication device 260 into a plurality of sub frequency bands. The reception unit 210 may receive radio environment information associated with the first communication device 260, and the frequency division unit 220 may divide the operating frequency bands based on the radio environment information.

The radio environment information associated with the first communication device 260 may be link state information of a radio link from the first communication device 260 to a second communication device 270. The second communication device 270 may receive reference signals transmitted from the first communication device 260, and measure a link state of the radio link from the first communication device 260 to the second communication device 270 based on the received reference signals. The second communication device 270 may transmit the measured link state to the cognitive radio communication device 200, and the reception unit 210 may receive the link state.

The radio environment information associated with the first communication device 260 may be link state information of a radio link from the first communication device 260 to the cognitive radio communication device 200. The reception unit 210 may receive reference signals from the first communication device 260, and may measure the link state of the radio line from the first communication device 260 to the cognitive radio communication device 200 based on the received reference signals.

The frequency division unit 220 may determine a bandwidth of the sub frequency band to be narrowed where a link state of the radio link is superior. In this case, the operating frequency bands may be divided into a large number of sub frequency bands.

According to another exemplary embodiment, the frequency division unit 220 may determine the bandwidth of the sub frequency band to be widened where the link state of the radio link is inferior. In this case, the operating frequency bands may be divided into a small number of sub frequency bands.

The first sensing unit 230 may sense each of the divided sub frequency bands using the reference signals received by the reception unit 210. The first sensing unit 230 may estimate whether each of the sub frequency bands is used by the first communication device 260. The first communication device 260 may measure an energy level of each of the sub frequency bands, and estimate whether each of the sub frequency bands is used based on the measured result.

The first communication device 260 may be a communication device to transmit television images or data packets. The first communication device 260 may be required to use a significantly widened frequency band so as to transmit the television images or data packets. The first communication device 260 may transmit the television images or data packets within all of the operating frequency bands.

The first communication device 260 may transmit voice signals. The first communication device 260 may use a significantly narrow frequency band so as to transmit the voice signals. The first communication device 260 may transmit the voice signals using only a portion of the operating frequency bands. In this case, the cognitive radio communication device 200 may transmit data to the second communication device 270 using a frequency band which is not used by the first communication device 260.

The first sensing unit 230 may determine at least one sub frequency band not used by the first communication device 260 as an unused frequency band group based on the estimated result.

The transmission unit 240 may transmit data to the second communication device 270 using a sub frequency band included in the unused frequency band group. The transmission unit 240 may transmit information about the unused frequency band group to the second communication device 270. The second communication device 270 may transmit data to the cognitive radio communication device 200 based on the information about the unused frequency band group. The reception unit 210 may receive, from the second communication device 270, the data transmitted based on the information about the unused frequency band group.

The cognitive radio communication device 200 may not use the sub frequency band used by the first communication device 260. In order to more securely protect the frequency band used by the first communication device 260, the cognitive radio communication device 200 may enable a sub frequency band adjacent to the sub frequency band used by the first communication device 260 not to be included in the unused frequency band group. The cognitive radio communication device 200 does not use the sub frequency band adjacent to the sub frequency band used by the first communication device 260 to perform data communication, and thus may protect the frequency band used by the first communication device 260.

Figure 3:
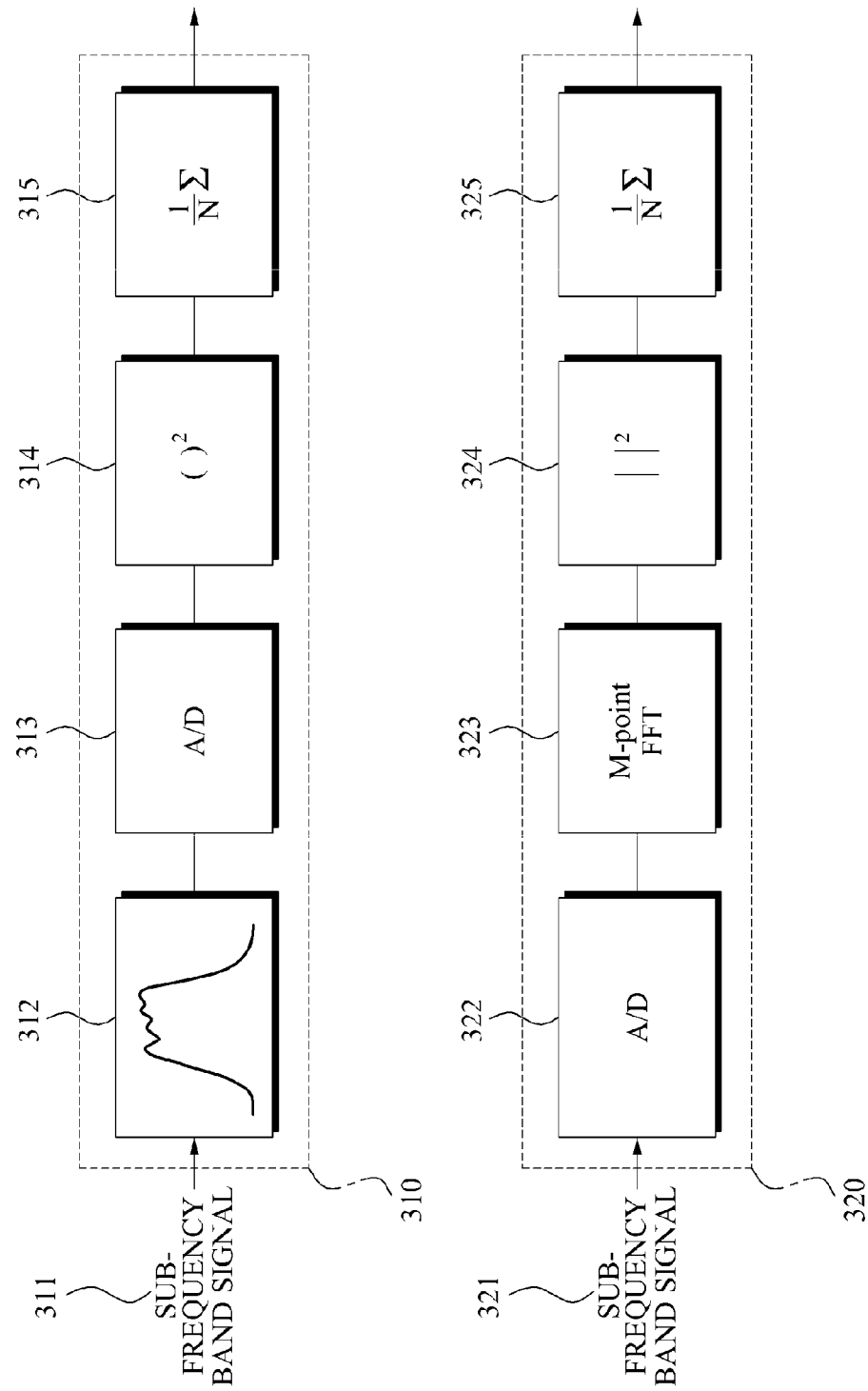
FIG. 3 is a block diagram illustrating an exemplary structure of a first sensing unit of a cognitive radio communication device.

FIG. 3 illustrates an exemplary structure of the first sensing unit 230 of the cognitive radio communication device 200 of FIG. 2.

A first sensing unit may estimate whether the first communication device 260 uses a specific sub frequency band. The first sensing unit 230 may measure energy of the specific sub frequency band to estimate whether the first communication device 260 uses the specific sub frequency band.

Referring to FIG. 2, the first sensing unit 230 may include an energy calculation unit 231 to calculate an energy level of reference signals with respect to each of the sub frequency bands, and a threshold energy comparison unit 232 to compare the calculated energy with a predetermined threshold value.

The energy calculation unit 231 may calculate the energy of the sub frequency band in a time domain as illustrated in a first segment 310, or in a frequency domain as illustrated in a second segment 320.

Where the energy of the sub frequency band is calculated in the time domain as illustrated in the first segment 310, the energy calculation unit 231 may receive reference signals 311 of the sub frequency band. The reference signals 311 of the sub frequency band may pass through a band pass filter 312. A bandwidth of a pass band of the band pass filter 312 may be the same as that of the sub frequency band. The frequency division unit 220 may determine the bandwidth of the sub frequency band or the bandwidth of the pass band of the band pass filter 312.

The reference signals passing through the band pass filter 312 may pass through an Analog/Digital (A/D) converter 313. The A/D converter 313 may convert analog signals into digital signals.

An instantaneous energy calculator 314 may calculate an energy level of reference signals that are converted in a digital type.

An average value calculator 315 may calculate an average value of powers of the reference signals. A value of a power of the reference signals at a specific point of time may be inaccurate due to effects of noise or interference signals. The average value calculator 315 may calculate an average value of powers of N samples to thereby increase reliability of the calculated result.

Where the energy of the sub frequency band is measured in the frequency domain as shown in the segment 320, the energy calculation unit 231 may receive reference signals 321 of the sub frequency band. The reference signals 321 of the sub frequency band may pass through the A/D converter 322.

The reference signals passing through the A/D converter 322 may pass through a Fourier transformer 323. The Fourier transformer 323 may convert the reference signals from signals of the time domain to signals of the frequency domain.

An instantaneous energy calculator 324 may calculate an energy level of the reference signals of the frequency domain.

An average value calculator 325 may calculate an average value of powers of the reference signals in the frequency domain.

The threshold energy comparison unit 232 may compare an energy calculated in the time domain or in the frequency band with a predetermined threshold value.

The first sensing unit 230 may estimate whether the first communication device 260 uses a specific sub frequency band. Where the calculated energy is less than the predetermined threshold value, the first sensing unit may determine that the first communication device 260 does not use the specific sub frequency band.

Figure 4:
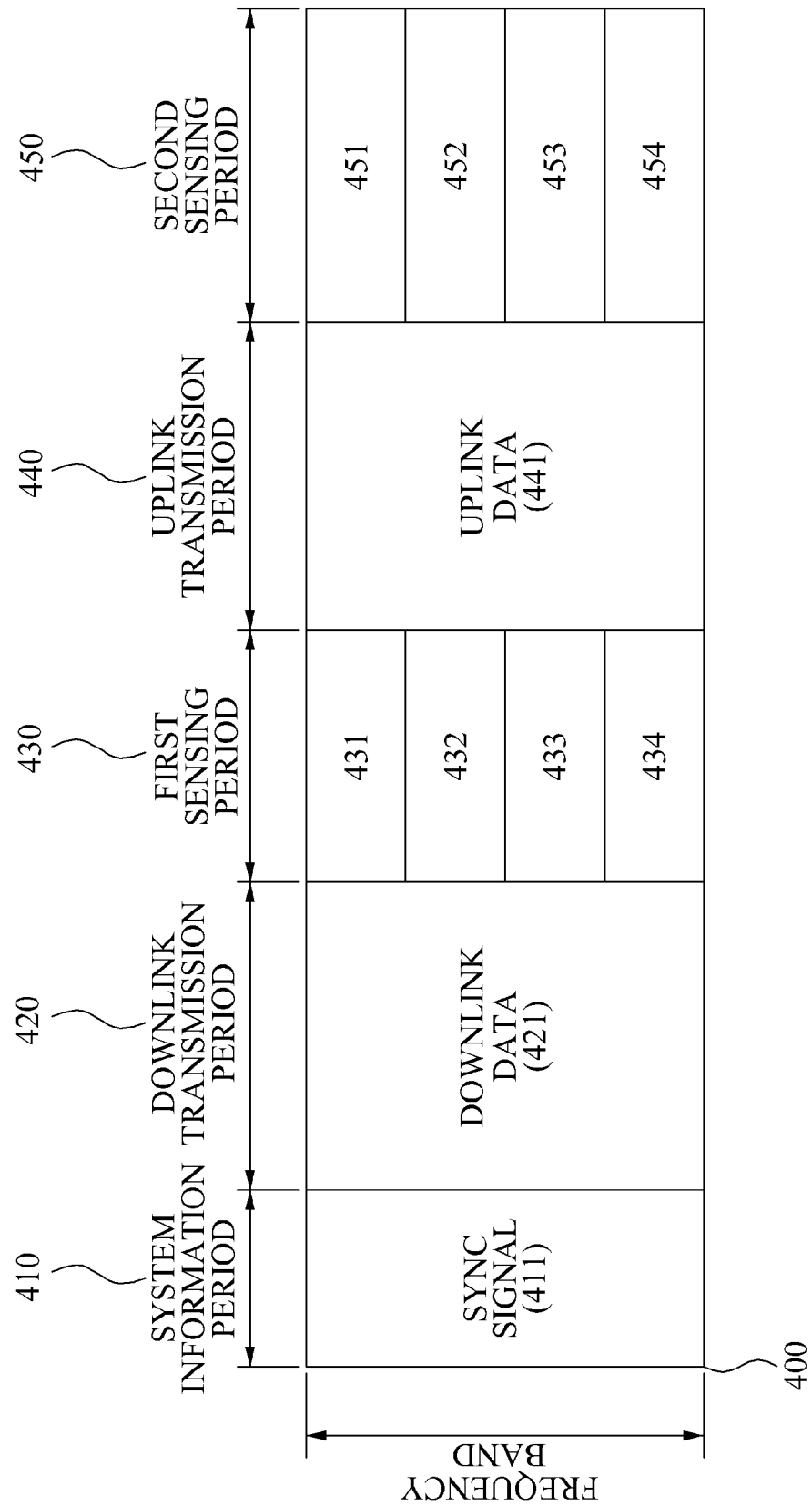
FIG. 4 is a diagram illustrating an exemplary structure of a data frame used in a cognitive radio communication device that may simultaneously perform frequency band sensing and data transmission.

FIG. 4 illustrates an exemplary structure of a data frame 400 corresponding to the cognitive radio communication device 200 of FIG. 2 that may simultaneously perform frequency band sensing and data transmission. FIG. 4 illustrates the data frame 400 in which the second communication device 270 or the cognitive radio communication device 200 transmits data. A vertical axis and horizontal axis of FIG. 4 may designate a lapse of time, and a frequency band, respectively.

The data frame 400 used to perform the cognitive radio communication may include a sync signal region 411, a downlink data region 421, first sensing regions 431, 432, 433, and 434, an uplink data region 441, and second sensing regions 451, 452, 453, and 454.

The second communication device 270 may transmit data of the sync signal region 411 during a system information period 410. The cognitive radio communication device 200 may synchronize with the first communication device 260 using data included in the sync signal region 411.

The second communication device 270 may transmit data of the downlink data region 421 during a downlink transmission period 420. Also, the cognitive radio communication device 200 may transmit data of the uplink data region 441 to the second communication device 270 during an uplink transmission period 440.

The second communication device 270 may not transmit data to the cognitive radio communication device during a first sensing period 430. The cognitive radio communication device 200 may not transmit data to the second communication device 270 during the first sensing period 430. Accordingly, the cognitive radio communication system of FIG. 1 may not transmit data, or may not radiate radio waves. Thus, the cognitive radio communication device 200 may receive radio waves transmitted from the first communication device during the first sensing period 430.

The cognitive radio communication device 200 may estimate whether the first communication device 260 uses radio waves of a specific frequency band based on the radio waves received during the first sensing period 430. The cognitive radio communication device 200 may divide operating frequency bands into a plurality of sub frequency bands 431, 432, 433, and 434, and estimate whether each of the divided plurality of sub frequency bands are used by the first communication device 260. The cognitive radio communication device 200 may determine sub frequency bands not used by the first communication device 260 as an unused frequency band group.

In order to more accurately estimate whether to use the radio waves of the specific frequency band, the cognitive radio communication device 200 may receive radio waves from the first communication device 260 for a longer period of time. Where a time of receiving the radio waves is insufficient, the cognitive radio communication device 200 may estimate that the first communication device 260 uses the sub frequency band not actually used by the first communication device 260.

The cognitive radio communication device 200 may not transmit data while receiving the radio waves from the first communication device 260. As a result, a communication performance of the cognitive radio communication system may be deteriorated. Particularly, the cognitive radio communication system of FIG. 1 may not interrupt transmission of the voice signals for a sufficiently long period of time where transmitting voice signals sensitive to time delay.

The cognitive radio communication system of FIG. 1 may sense each of the sub frequency bands for the first sensing period 430 to estimate whether the first communication device 200 uses each of the sub frequency bands. Then, the cognitive radio communication system of FIG. 1 may further estimate whether the first communication device 260 uses the sub frequency band estimated to be used by the first communication device 260 for a longer period of time.

The cognitive radio communication system of FIG. 1 may intercept data transmission during the first sensing period 430 corresponding to several microseconds, and sense each of the sub frequency bands. With respect to the sub frequency band estimated to be used by the first communication device 260, data transmission may be interrupted during a second sensing period 450 corresponding to several milliseconds, and each of the sub frequency bands may be sensed by the cognitive radio communication system of FIG. 1.

The cognitive radio communication device 200 may receive reference signals from the first communication device 260 for the second sensing period 450. The cognitive radio communication device 200 may compare a pattern of the reference signals and a predetermined pilot pattern to re-sense a sub frequency band included in an unused frequency band group. The cognitive radio communication device 200 may determine the sub frequency band estimated as having been used by the first communication device 260 based on the estimated result during the first sensing period 430, as not having been used by the first communication device 260 based on the estimated result during the second sensing period 450. The cognitive radio communication device may enable the sub frequency band not having been used by the first communication device 260 to be included in the unused frequency band group based on the sensed result during the second sensing period 450.

The cognitive radio communication device 200 may transmit data to the second communication device 270 during the second sensing period 450. The sub frequency band included in the unused frequency band group based on the estimated result during the first sensing period 430 may be not used by the first communication device 260. Accordingly, the cognitive radio communication device 200 may transmit data to the second communication device 270 using the sub frequency band included in the unused frequency band group.

The cognitive radio communication device 200 may transmit data even during the second sensing period 450, whereby data transmission performance is increased. Particularly, where the cognitive radio communication device 200 transmits data sensitive to time delay such as voice signals, a possibility in which data transmission is interrupted or a connection with the first communication device 260 is interrupted may be reduced.

Where the cognitive radio communication device 200 transmits a plurality of sub data having different priorities, the transmission unit 250 of the cognitive radio communication device 200 may transmit data based on the priority between the plurality of sub data. The cognitive radio communication device 200 may assign a relatively high priority with respect to the voice signals that are sensitive to time delay, and assign a relatively low priority with respect to web-surfing, file transmission data, and the like that are not sensitive to the time delay. The second communication system 141 may transmit data only using the sub frequency band not used by the first communication device 260 during the second sensing period 450, and thus a bandwidth of the frequency band capable of being used by the second communication system 141 may be limited. However, a specific sub data may be preferentially transmitted, whereby fatal performance deterioration caused due to the time delay may be avoided.

Figure 5:
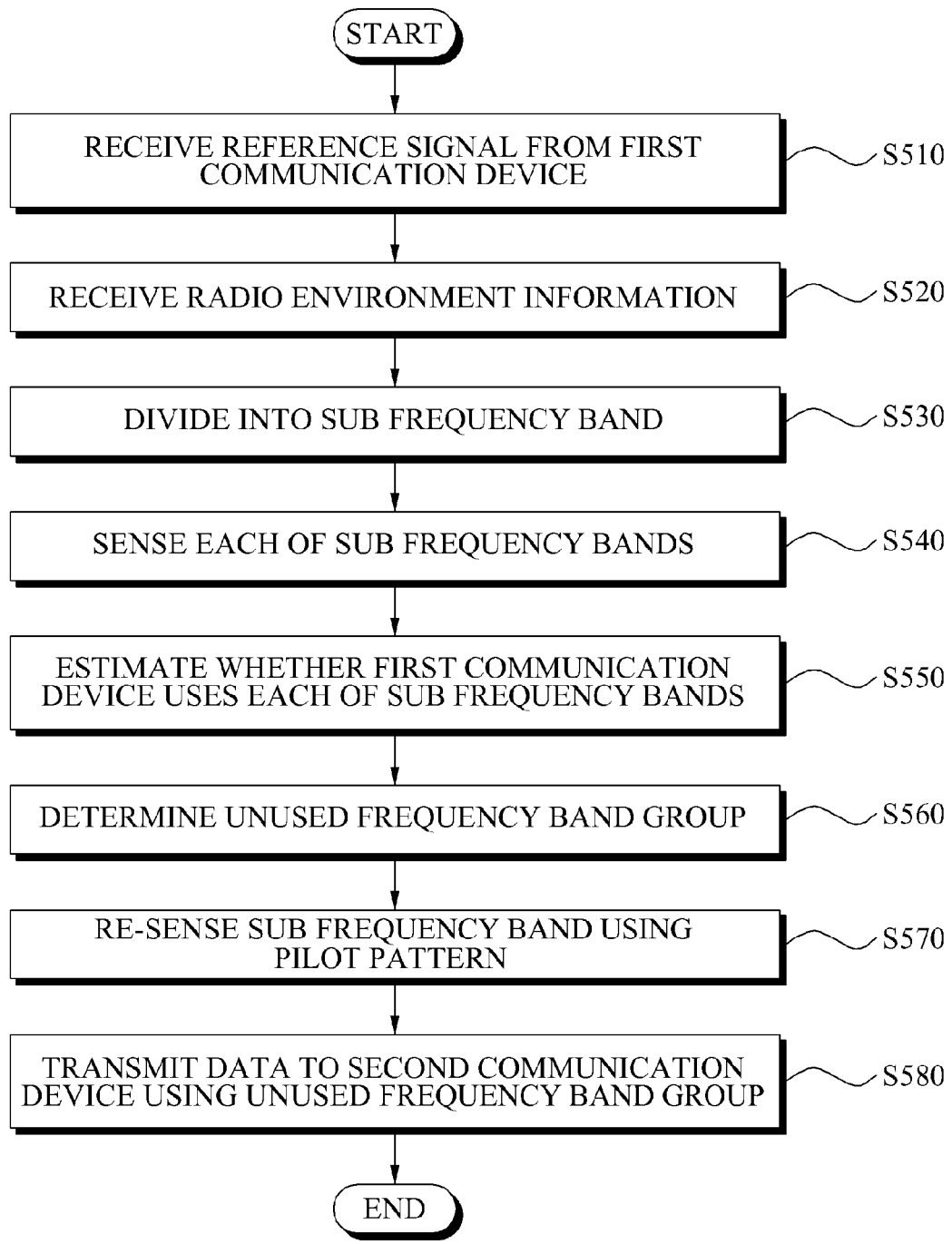
FIG. 5 is a flowchart illustrating an exemplary cognitive radio communication method.

FIG. 5 is a flowchart illustrating a cognitive radio communication method according to an exemplary embodiment.

In operation S510, the cognitive radio communication device 200 may receive reference signals from the first communication device 260. The reference signals may be signals transmitted by the first communication device 260 to perform data transmission, or control signals transmitted to maintain synchronization with a voice terminal, a television, and the like. Furthermore, any signals may designate the reference signals as long as those signals correspond to the cognitive radio communication device 200 receiving and sensing an operating frequency band without regard to a purpose in which the first communication device 260 transmits the reference signals.

In operation S520, the cognitive radio communication device 200 may receive, from the second communication device 270, radio environment information associated with the first communication device 260. The radio environment information may be link state information of a radio link from the first communication device 260 to the second communication device 270, or link state information of a radio link from the first communication device 260 to the cognitive radio communication device 200.

In operation S530, the cognitive radio communication device 200 may divide operating frequency bands of the first communication device 260 into a plurality of sub frequency bands. The cognitive radio communication device 200 may divide the operating frequency bands based on the radio environment information.

The radio environment information may be the link state information of the radio link from the first communication device 260 to the cognitive radio communication device 200, and the cognitive radio communication device 200 may determine a bandwidth of the sub frequency band to be widened where the radio link state is superior. Accordingly, the operating frequency bands of the first communication device 260 may be divided into a relatively small number of sub frequency bands.

The cognitive radio communication device 200 may determine the bandwidth of the sub frequency band to be narrowed where the radio link state is inferior. Accordingly, the operating frequency bands of the first communication device 260 may be divided into a relatively large number of sub frequency bands.

The cognitive radio communication device 200 may divide the operating frequency bands into an optimum number of sub frequency bands based on the radio link state.

In operation S540, the cognitive radio communication device 200 may sense each of the plurality of sub frequency bands. In operation S540, an operation of calculating an energy level of the reference signal with respect to each of the plurality of sub frequency bands and an operation of comparing the calculated energy and a predetermined threshold value may be included.

In operation S550, the cognitive radio communication device 200 may estimate whether the first communication device 260 uses each of the plurality of sub frequency bands. It may be estimated that the first communication device 260 uses each of the plurality of sub frequency bands where the calculated energy is greater than the predetermined threshold value in operation S540.

In operation S560, the cognitive radio communication device 200 may determine an unused frequency band group including sub frequency bands not used by the first communication device 260.

In operation S570, the cognitive radio communication device 200 may re-sense whether the first communication device 260 uses the sub frequency bands not included in the unused frequency band group. The energy of each of the plurality of sub frequency bands may be calculated to estimate whether the first communication device 260 uses each of the plurality of sub frequency bands in operation S540, and a pattern of the reference signal and a predetermined pilot pattern may be compared with each other to estimate whether the first communication device 260 uses each of the plurality of sub frequency bands in operation S570. A method performed based on the energy calculation may sense the reference signal during a relatively short period of time to estimate, however, this method may be somewhat inaccurate. In contrast, a method performed based on a comparison with the pilot pattern may sense the reference signal during a relatively long period of time to estimate, however, and this method may be more accurate.

Whether the first communication device 260 uses each of the plurality of sub frequency bands may be estimated based on the energy calculation in operation S540, and sub frequency bands that are somewhat inaccurate as to whether to be used by the first communication device 260 may be compared with the pilot pattern in operation S570 to thereby more accurately estimate whether to be used by the first communication device 260.

In operation S580, the cognitive radio communication device 200 may transmit data to the second communication device 270 using the sub frequency band included in the unused frequency band group. As illustrated in FIG. 5, operation S580 is performed after operation S570, however, operation S570 and operation S580 may be performed in parallel. In this case, in operation S580, the cognitive radio communication device 200 may transmit data to the second communication device 270 only using the sub frequency bands included in the unused frequency band group in operation S540.

The data transmitted by the cognitive radio communication device 200 in operation S580 may include a plurality of sub-data having different priorities from each other. In operation S580, the cognitive radio communication device 200 may transmit the data based on a priority between the plurality of sub-data. The data may not be transmitted using all of the operating frequency bands in operation S580, however, data having a relatively high priority may be transmitted using a limited frequency band. According to an exemplary embodiment, the cognitive radio communication device 200 may assign a relatively high priority with respect to voice data sensitive to time delay. The voice data may be preferentially transmitted in comparison other data, and thus a voice communication between the second communication device 270 and the cognitive radio communication device 200 may not be interrupted.

Where the first communication device 260 transmits first data using a part of the entire of the operating frequency bands, the cognitive radio communication device 200 may transmit second data to the second communication device 270 using frequency bands which are not used by the first communication device 260.

Figure 6:
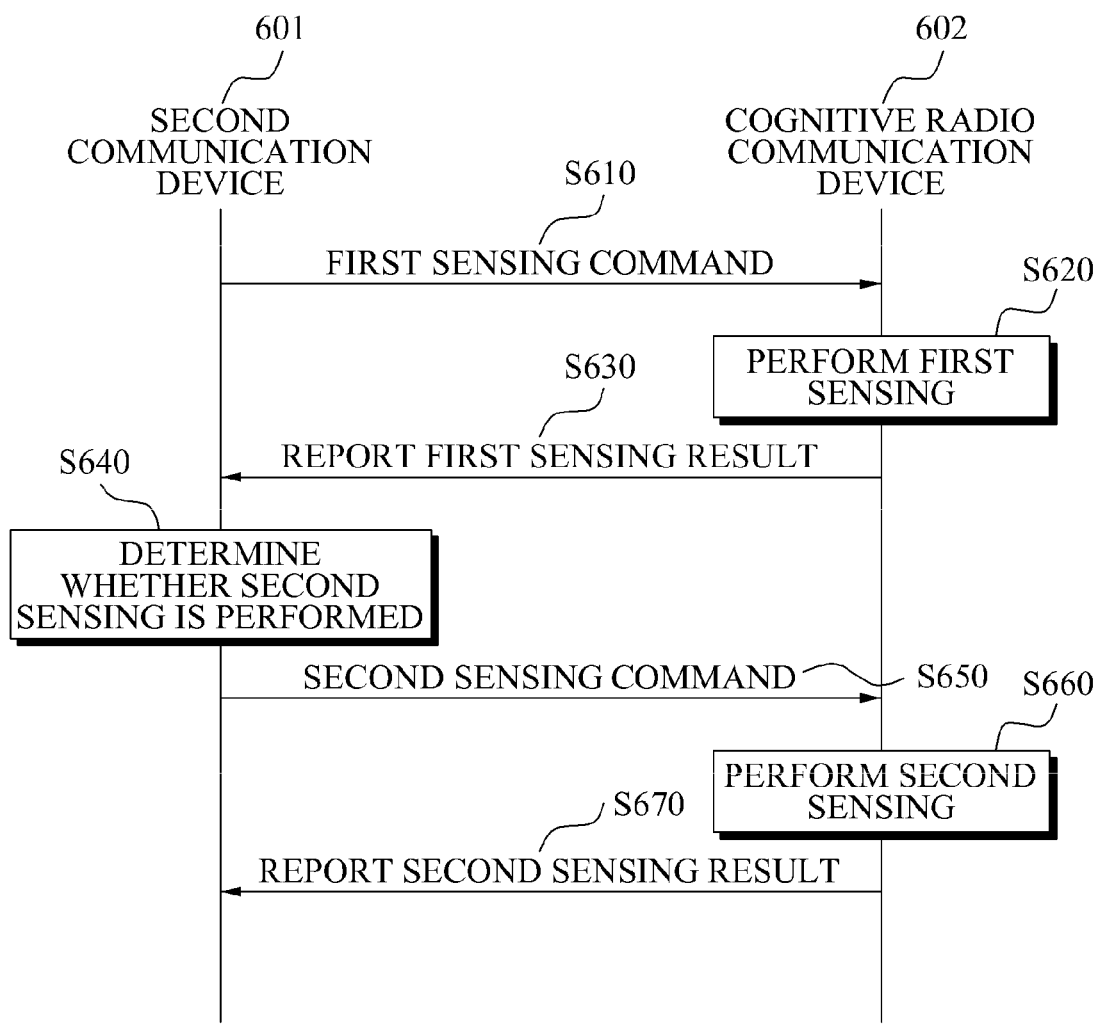
FIG. 6 is a flowchart illustrating operations of an exemplary cognitive radio communication device cooperating with a second communication device.

FIG. 6 is a flowchart illustrating operations of a cognitive radio communication device 602 cooperating with a second communication device 601 according to an exemplary embodiment.

In operation S610, the second communication device 601 may transmit a first sensing command to the cognitive radio communication device 602. The first sensing command may include radio environment information associated with the first communication device 260. The radio environment information may be link state information of a radio link from the first communication device 260 to the second communication device 601, or link state information of a radio link from the first communication device 260 to the cognitive radio communication device 602. The cognitive radio communication device 602 may divide operating frequency bands based on the state information of the radio link.

In operation S620, the cognitive radio communication device 602 may perform a sensing operation with respect to the operating frequency bands. The cognitive radio communication device 602 may divide the operating frequency bands into a plurality of sub frequency bands, and estimate whether each of the divided plurality of sub frequency bands is used by the first communication device 260. The cognitive radio communication device 602 may divide the operating frequency bands into a relatively large number of sub frequency bands where the link state of the radio link is superior, and also divide the operating frequency bands into a relatively small number of sub frequency bands where the link state of the radio link is inferior.

Also in operation S620, the cognitive radio communication device 602 may measure an energy level of each of the plurality of sub frequency bands to estimate whether the first communication device 260 uses a corresponding sub frequency band. The cognitive radio communication device 602 may measure the energy of the plurality of sub frequency bands in a frequency domain or a time domain, and compare the measured energy with a predetermined threshold value. The cognitive radio communication device 602 may estimate that the first communication device 260 uses the corresponding sub frequency band where the measured energy is greater than the predetermined threshold value.

The cognitive radio communication device 602 may determine sub frequency bands which are not used by the first communication device 260 to be an unused frequency band group.

In operation S630, the cognitive radio communication device 602 may report a first sensing result to the second communication device 601. The cognitive radio communication device 602 may report, to the second communication device 601, information about the sub frequency band included in the unused frequency band group.

In operation S640, the second communication device 601 may determine whether a second sensing operation is performed. The second communication device 601 may determine whether the second sensing is performed based on the first sensing result. Where the first communication device 260 uses all of the sub frequency bands based on the first sensing result, that is, where the sub frequency bands included in the unused frequency band group are absent, the second communication device 601 may determine the cognitive radio communication device 602 to not perform the second sensing.

Where the first communication device 260 does not uses any sub frequency band based on the first sensing result, the second communication device 601 may determine the cognitive radio communication device 602 to not perform the second sensing.

In operation S650, the second communication device 601 may transmit a second sensing command to the cognitive radio communication device 602. The second sensing command may include information about a point in time where the cognitive radio communication device 602 performs the second sensing, or information with respect to the sub frequency band. The second sensing command may include information about a guard frequency band in which the cognitive radio communication device 602 does not transmit data from among the unused frequency band group.

In operation S660, the cognitive radio communication device 602 may perform the second sensing. The cognitive radio communication device 602 may perform the second sensing based on the second sensing command. The cognitive radio communication device 602 may perform the second sensing only with respect to a specific sub frequency band included in the second sensing command.

The second sensing performed in operation S660 may be performed by comparing a pattern of reference signals received from the first communication device 260 and a predetermined pilot pattern. More particularly, a sensing scheme performed based on a pattern comparison method performed in operation S660 may be more accurate than a sensing scheme performed based on an energy measuring method performed in operation S620. However, the sensing scheme performed based on the pattern comparison method may need an even longer period of time than the sensing scheme performed based on the energy measuring method.

The second communication device 601 or the cognitive radio communication device 602 may not radiate radio waves, and only receive the reference signals transmitted from the first communication device 260 while the first sensing and the second sensing are respectively performed in operation S620 and operation S660. Where the second communication device 601 or the cognitive radio communication device 602 emits the radio waves, interference between the radio waves and the reference signals received from the first communication device may occur, thereby resulting in more accurate sensing.

The cognitive radio communication device 602 may transmit data to the second communication device 601 using the sub frequency bands included in the unused frequency band group in operation S660. The sub frequency bands included in the unused frequency band group may be sub frequency bands confirmed to be not used by the first communication device 260, and may not deteriorate data transmission performance of the first communication device 260 even though the cognitive radio communication device 602 uses the sub frequency bands for the purpose of data transmission.

The cognitive radio communication device 602 may transmit data using a part of the frequency bands even though performing the second sensing in operation S660 is for the purpose of accurate sensing. As a result, frequency utilization efficiency and data transmission performance may increase. In particular, where the first communication device 260 does not use all of the entire operating frequency bands, the data transmission performance of the cognitive radio communication device 602 may increase. Where voice data sensitive to time delay is transmitted, data transmission performance of the cognitive radio communication device 602 may increase.

Sub frequency bands estimated as being used by the first communication device 260 based on the first sensing result may be estimated as being not used by the first communication device 260 based on the second sensing result. In this case, the cognitive radio communication device 602 may update the unused frequency band group based on the second sensing result.

In operation S670, the cognitive radio communication device 602 may report the second sensing result to the second communication device 601. The cognitive radio communication device 602 may transmit, to the second communication device 601, information about the unused frequency band group updated based on the second sensing result.

The second communication device 601 may transmit data to the cognitive radio communication device 602 based on the information about the updated unused frequency band group. The second communication device 601 may transmit data to the cognitive radio communication device 602 using the sub frequency band confirmed as being not used by the first communication device 260 based on the first and second sensing results, and thus transmitting data to the second communication device 601 to the cognitive radio communication device 602 while not deteriorating communication performance of the first communication device 260.

Figure 7A:
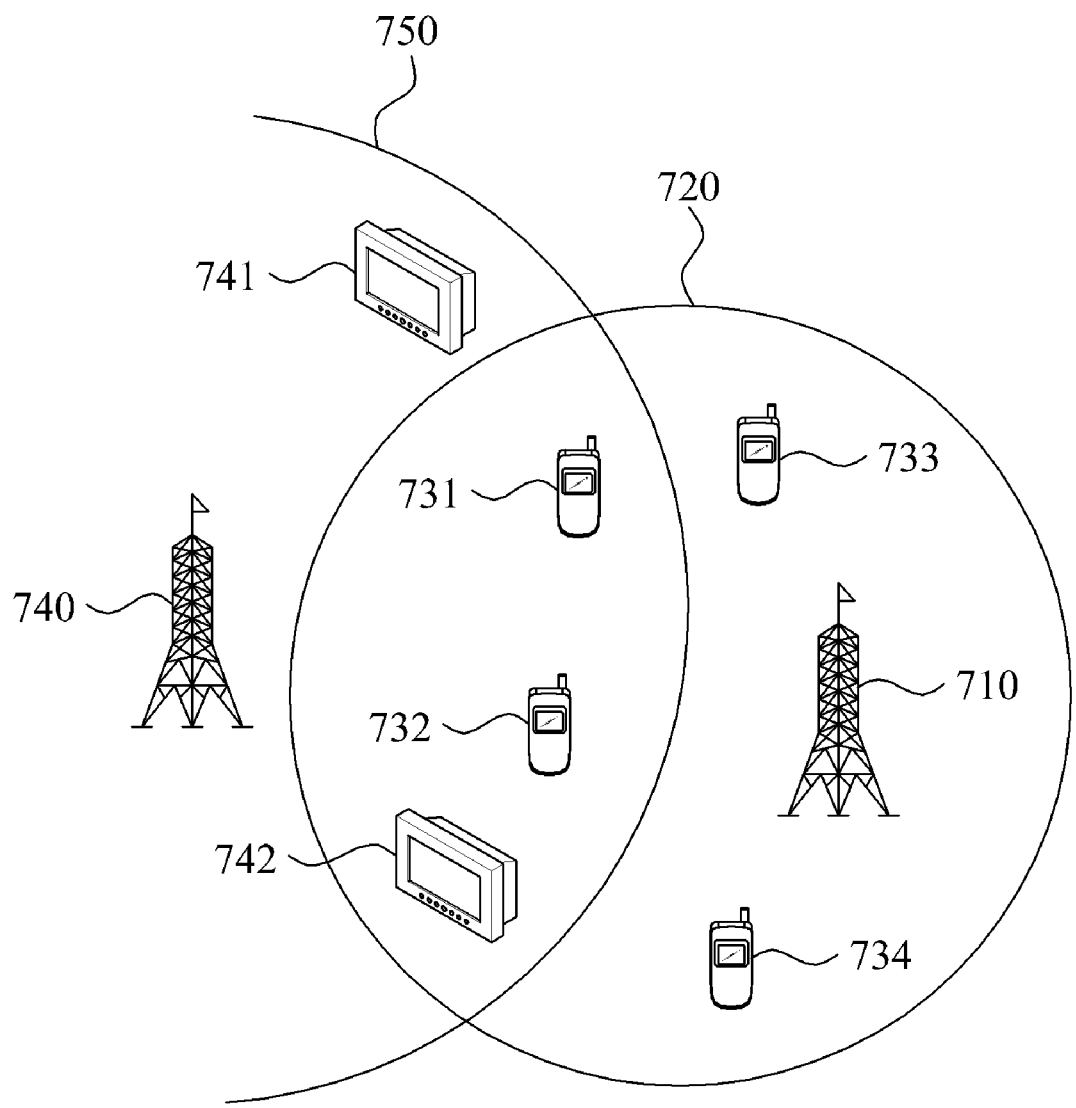
FIGS. 7A and 7B are schematic diagrams illustrating an exemplary cognitive radio communication system that may select a sensing terminal to sense operating frequency bands of a primary communication device based on characteristics of the primary communication device.
Figure 7B:
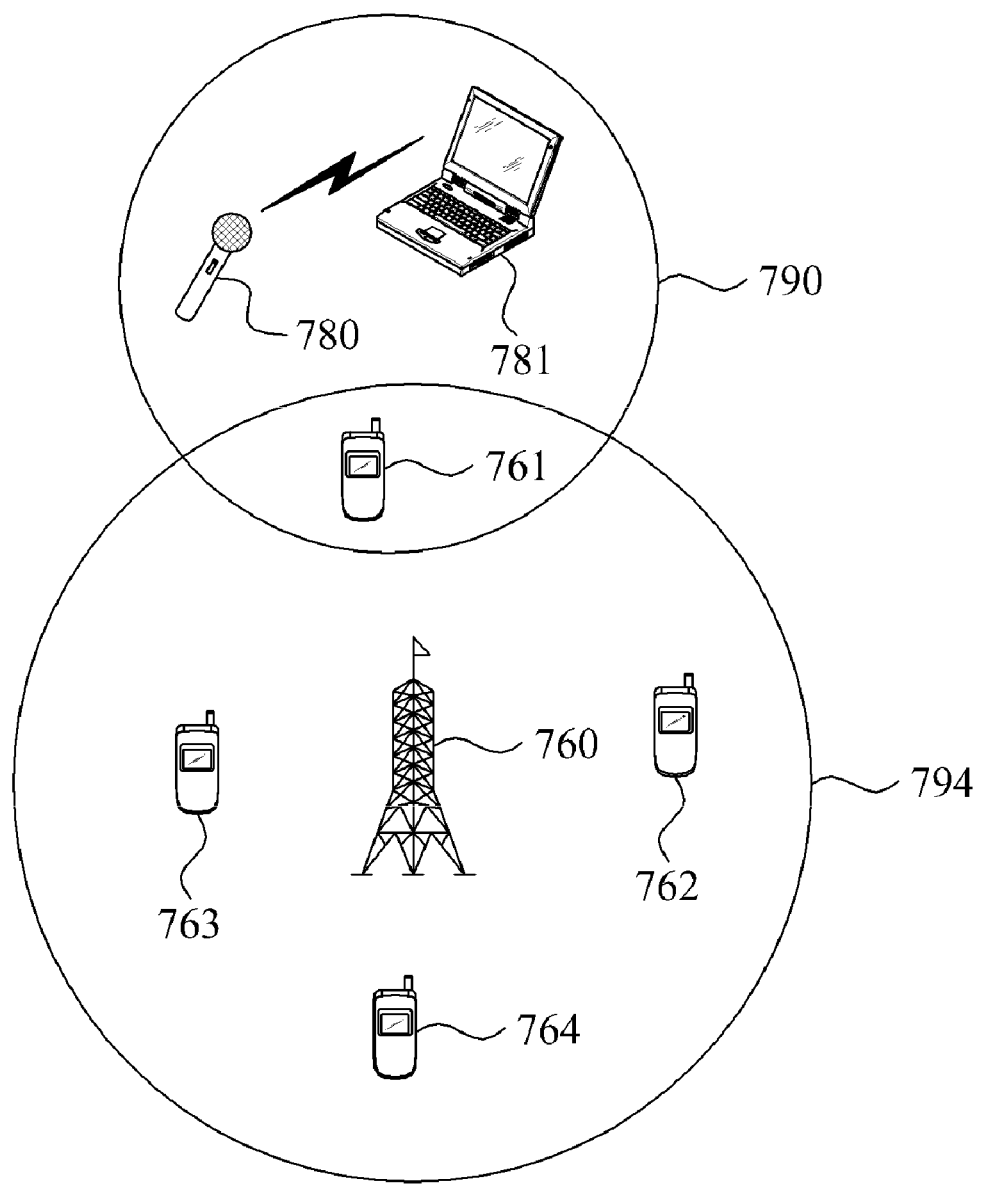

FIGS. 7A and 7B illustrate a cognitive radio communication system that may select a sensing terminal to sense operating frequency bands of a primary communication device 740 depending on characteristics of the primary communication device 740 according to an exemplary embodiment.

FIG. 7A illustrates the primary communication device 740 transmitting data with a relatively high transmission power, and FIG. 7B illustrates the primary communication device 740 transmitting data with a relatively low transmission power.

As illustrated in FIG. 7A, the primary communication device 740 may transmit data to primary terminals 741 and 742. The primary communication device 740 and the primary terminals 741 and 742 may be assigned with operating frequency bands, and transmit data using the assigned operating frequency bands.

A cognitive radio communication base station 710 may transmit data to a plurality of cognitive radio communication terminals 731, 732, 733, and 734 connected with the cognitive radio communication base station 710. The cognitive radio communication base station 710 may transmit data using frequency bands which are not used by the primary communication device 740 from among the operating frequency bands assigned to the primary communication device 740.

The primary communication device 740 illustrated in FIG. 7A may be a communication device which transmits data with a relatively high transmission power. The primary communication device 740 may be a relay station transmitting television image signals. Also, the primary terminals 741 and 742 may be a television.

Referring to FIG. 7A, a signal coverage radius 750 of the primary communication device 740 which transmits data with a relatively high transmission power such as a television relay station may be significantly wide. Accordingly, most of the cognitive radio communication terminals 731 and 732 connected with the cognitive radio communication base station 710 may be located within the signal coverage radius 750 of the primary communication device 740.

Thus, the cognitive radio communication base station 710 may select sensing terminals to sense the operating frequency bands of the primary communication device 740 from among all of the cognitive radio communication terminals 731, 732, 733, and 734 located within a signal coverage radius 720 of the cognitive radio communication base station 710.

A primary communication device 780 illustrated in FIG. 7B may be a transmission device to transmit data with a relatively low transmission power. According to an exemplary embodiment, the primary communication device 780 may be a microphone transmitting voice signals. The primary terminal 781 may receive the voice signals. A bandwidth of the voice signal may be significantly narrow, and thereby most frequency bands from among the operating frequency bands assigned to the primary communication device 780 may be not used. Also, the voice signals may be transmitted with a relatively low transmission power, and thus may not be transmitted over a relatively long distance. Accordingly, a signal coverage radius 790 of the primary communication device 780 may be significantly restricted.

Thus, a cognitive radio communication base station 760 may select, as a sensing terminal, only a cognitive radio communication terminal 761 located within the signal coverage radius 790 of the primary communication device 780, from among a plurality of cognitive radio communication terminals 761, 762, 763, and 764 located within a signal coverage radius 794 of the cognitive radio communication base station 760.

Where the cognitive radio communication terminal 761 is selected as the sensing terminal, the cognitive radio communication terminal 761 may sense the operating frequency band assigned to the primary communication device 780, and estimate frequency bands not used by the primary communication device 780. The cognitive radio communication base station 760 may transmit data to the sensing terminal 761 using the frequency bands which are not used by the primary communication device 780.

Figure 8:
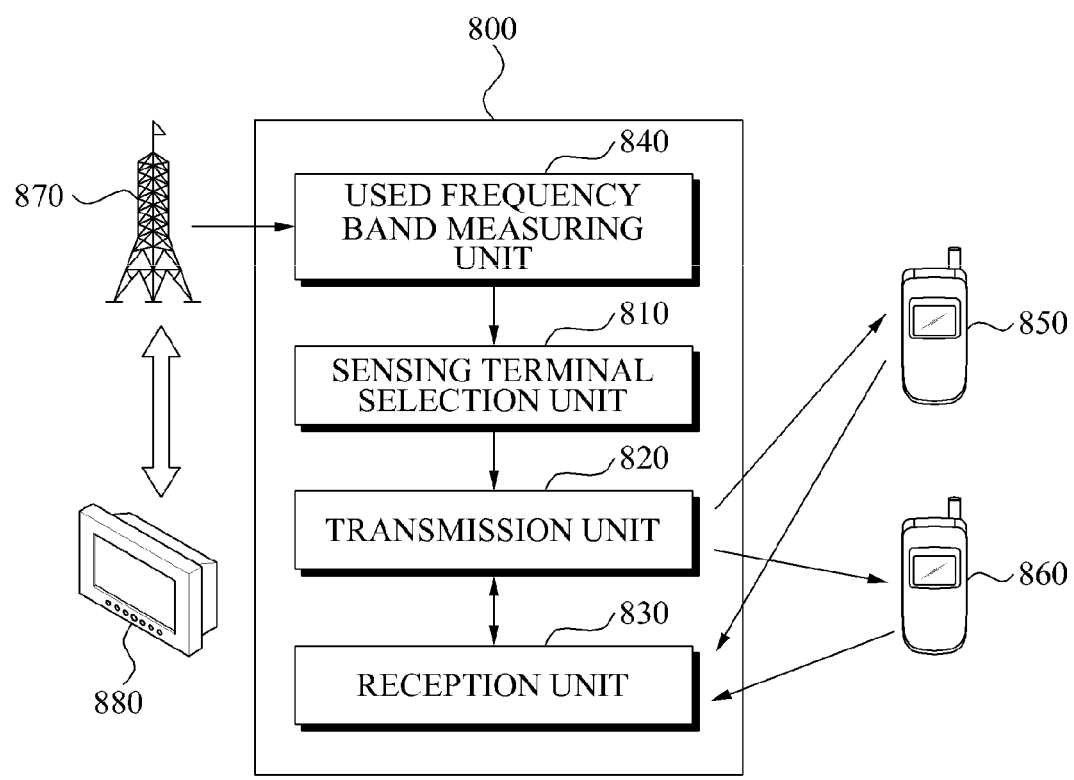
FIG. 8 is a block diagram illustrating another exemplary structure of a cognitive radio communication base station.

FIG. 8 illustrates a structure of a cognitive radio communication base station 800 according to another exemplary embodiment. Hereinafter, operations of the cognitive radio communication base station 800 according to the present exemplary embodiment will be described in detail with reference to FIG. 8. The cognitive radio communication base station 800 may include a sensing terminal selection unit 810, a transmission unit 820, a reception unit 830, and a used frequency band measuring unit 840.

A primary communication device 870 may transmit data to a primary terminal 880 using operating frequency bands assigned to the primary communication device 870. The primary communication device 870 may use a portion or all of the operating frequency bands based on characteristics of data transmitted by the primary communication device 870. Also, the primary communication device 870 may use the operating frequency bands indefinitely, or only for a specific period of time.

The cognitive radio communication device 800 and the cognitive radio communication terminals 850 and 860 may perform communication using the frequency bands not used by the primary communication device 870, or using the operating frequency bands assigned to the primary communication device 870 during a period of time where the primary communication device 870 does not use the frequency band.

The sensing terminal selection unit 810 may select a sensing terminal to sense the operating frequency bands assigned to the primary communication device from among the cognitive radio communication terminals 850 and 860. The sensing terminal selection unit 810 may select the sensing terminal based on reference signals received by the primary communication device 870.

The used frequency band measuring unit 840 may measure a frequency band utilized by the primary communication device 870 using reference signals received from the primary communication device 870. The used frequency band measuring unit 840 may measure a bandwidth of the used frequency band.

The sensing terminal selection unit 810 may compare a bandwidth of the used frequency band and a bandwidth of the operating frequency band, and thereby select a sensing terminal based on a compared result. The sensing terminal selection unit 810 may determine a signal coverage radius of the primary communication device 870 as being significantly wide where the bandwidth of the used frequency band is relatively wide. The sensing terminal selection unit 810 may select the sensing terminal from among all terminals connected with the cognitive radio communication base station 800.

The reception unit 830 may receive, from the cognitive radio communication terminals 850 and 860, a sensing result with respect to the operating frequency bands, and the sensing terminal selection unit 810 may select a sensing terminal based on the sensing result received from the cognitive radio communication terminals 850 and 860. Each of the cognitive radio communication terminals 850 and 860 may divide the operating frequency bands into a plurality of sub frequency bands, and measure an energy level of each of the plurality of sub frequency bands to estimate whether the primary communication device 870 uses a specific sub frequency band.

The sensing terminal selection unit 810 may determine the signal coverage radius of the primary communication device as being significantly wide when receiving the sensing result from the almost cognitive radio communication terminals 850 and 860 connected with the cognitive radio communication base station 800. Accordingly, the sensing terminal selection unit 810 may select the sensing terminal from among all terminals connected with the cognitive radio communication base station 800.

Conversely, the sensing terminal selection unit 810 may determine the signal coverage radius of the primary communication device 870 as being relatively narrow, where the bandwidth of the used frequency band is relatively narrow, or where the sensing result is received from only a part of the cognitive radio communication terminals 850 or 860. Accordingly, the sensing terminal selection unit 810 may select the sensing terminal from among the part of the cognitive radio communication terminals 850 and 860 adjacent to a periphery of the primary communication device 870.

Where the signal coverage radius of the primary communication device 870 is relatively restricted, only portions of the cognitive radio communication terminals 850 and 860 which are adjacent to the periphery of the primary communication device 870 and which are selected as the sensing terminal may sense the operating frequency band of the primary communication device 870. Other terminals which are not selected as sensing terminals may not sense the operating frequency band, and thus do not perform an unnecessary feedback operation, thereby reducing a power consumption.

The sensing terminal selection unit 810 may select the sensing terminal depending on a ratio of the bandwidth of the used frequency band to the bandwidth of the operating frequency band. It is assumed that the primary communication device 870 may transmit data to a specific region where the ratio of the bandwidth of the used frequency band to the bandwidth of the operating frequency band is less than a predetermined ratio, and the primary communication device 870 may have a significantly restricted signal coverage radius. Specifically, it is assumed that a transmission power of the primary communication device 870 is significantly low. The sensing terminal selection unit 810 may select, as the sensing terminal, only terminals located in a specific region of the signal coverage radius of the cognitive radio communication base station 800.

The reception unit 830 may receive a sensing result only from a portion of the cognitive radio communication terminals 850 and 860 which are connected with the cognitive radio communication device 800. It is assumed that the cognitive radio communication terminals 850 and 860 transmitting the sensing result are reference signal sensing terminals. The sensing terminal selection unit 810 may determine the signal coverage radius of the primary communication device 870 as being significantly wide where a number of the reference signal sensing terminals is relatively large. Specifically, the sensing terminal selection unit 810 may determine a transmission power of the primary communication device as being significantly high.

The sensing terminal selection unit 810 may select the sensing terminal based on a ratio of a number of the reference signal sensing terminals to a number of the plurality of cognitive radio communication devices 850 and 860.

The sensing terminal selection unit 810 may select the sensing terminal depending on a type of power supply of the cognitive radio communication terminals 850 and 860. The cognitive radio communication terminals 850 and 860 may be supplied with a power from a battery (not illustrated), however, may be supplied with the power from a power supply network. The battery, that is, a power supply device which stores a certain power may be an unstable power supply system that may no longer supply the power where the cognitive radio communication terminals 850 and 860 completely consume the certain power. However, the power supply network may supply a power produced in a power plant, and may be a stable power supply system that may supply a power as long as a natural disaster (i.e., flood, hurricane, etc.) does not occur. Since various types of power supplies can be used, the type of the power supply may dictate whether each of the cognitive radio communication terminals 850 and 860 is supplied with a power from an unstable power supply system or a stable power supply system.

The sensing terminal selection unit 810 may preferentially select, as the sensing terminal, the cognitive radio communication terminals 850 and 860 to which the power is supplied from the stable power supply system.

So that the sensing terminal senses the operating frequency bands of the primary communication device 870, a significantly large amount of power may be required. The sensing terminal selection unit 810 may select, as the sensing terminal, the cognitive radio communication terminals 850 and 860 to which the power is supplied from the stable power supply system, thereby minimizing unnecessary power consumption. Specifically, the power consumption of the cognitive radio communication terminals 850 and 860 which are supplied with the power from the unstable power supply system may be minimized.

Hereinafter, it is assumed that a first cognitive communication terminal 850 is selected as the sensing terminal, and therefore is designated at the sensing terminal 840.

The transmission unit 820 may inform the first cognitive radio communication terminal 850 of being selected as the sensing terminal 850. The sensing terminal 850 may sense the operating frequency band of the primary communication device 870.

The sensing terminal 850 may receive reference signals from the primary communication device 870, and compare a pattern of the reference signals and a predetermined pilot pattern to accurately measure the operating frequency band.

The reception unit 830 may receive, from the sensing terminal, a sensed result with respect to the operating frequency band.

The transmission unit 820 may transmit data to the sensing terminal 850 using the operating frequency band of the primary communication device 870 based on the sensed result.

Figure 9:
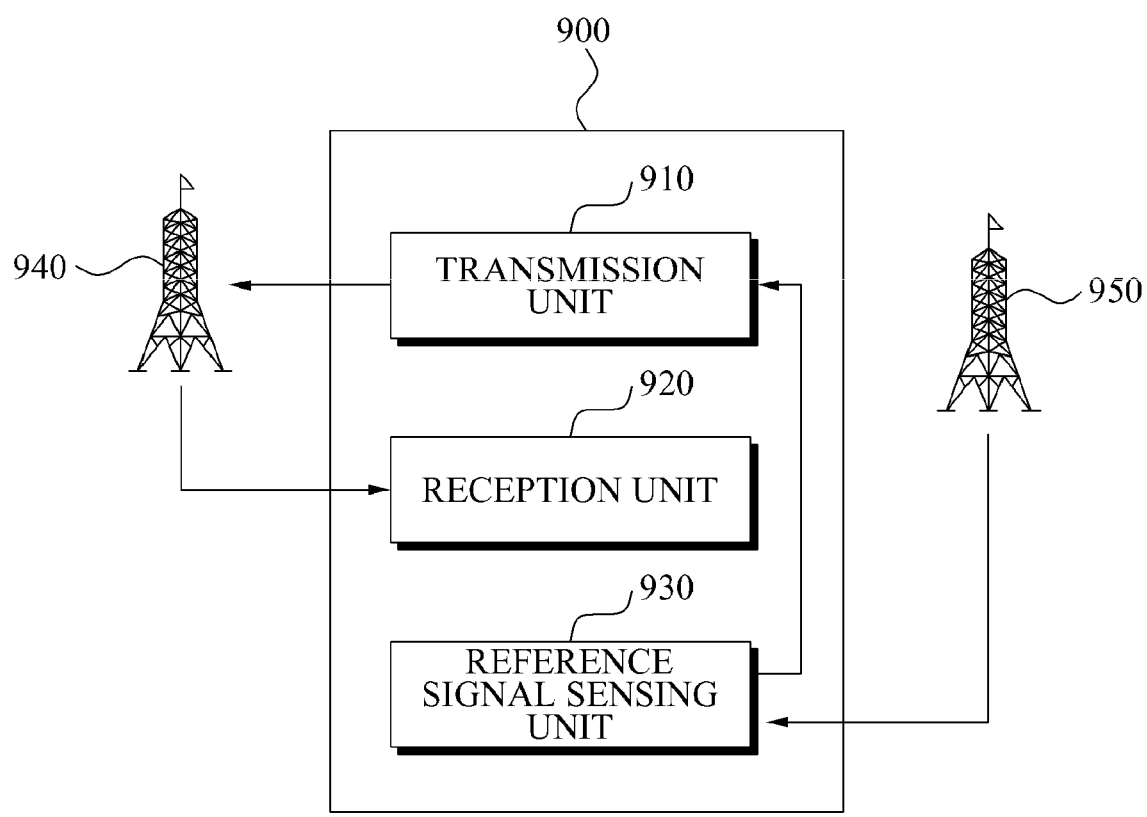
FIG. 9 is a block diagram illustrating another exemplary structure of a cognitive radio communication terminal.

FIG. 9 illustrates a structure of a cognitive radio communication terminal 900 according to another exemplary embodiment. The cognitive radio communication terminal 900 may include a transmission unit 910, a reception unit 920, and a reference signal sensing unit 930.

The transmission unit 910 may transmit a power supply type of the cognitive radio communication terminal 900 to a cognitive radio communication device 940. The cognitive radio communication terminal 900 may be supplied with a power from the stable power supply system such as the power supply network as referenced above regarding FIG. 8, however, and may be supplied with the power from the unstable power supply system such as the battery. The power supply type may include information about stability of the power with which the cognitive radio communication terminal 900 is supplied, or information about a sum of the power remaining in the power supply system.

The cognitive radio communication device 940 may select a sensing terminal from among a plurality of cognitive radio communication devices based on the power supply type of the cognitive radio communication terminal 900. The cognitive radio communication device 940 may preferentially select, as the sensing terminal, the cognitive radio communication device 940 which is supplied with the power from the stable power supply system.

The reception unit 920 may receive information about the sensing terminal selected based on the power supply type. The reception unit 920 may estimate whether the reception unit 920 is selected as the sensing terminal based on the information about the sensing terminal. Hereinafter, it is assumed that the cognitive radio communication terminal 900 illustrated in FIG. 9 is selected as the sensing terminal.

The reference signal sensing unit 930 may sense reference signals received from a primary communication device 950. The reference signal sensing unit 930 may estimate the frequency bands used by or not used by the primary communication device 950 from among the operating frequency bands assigned to the primary communication device 950 based on the reference signals.

The transmission unit 910 may transmit information about the frequency band not used by the primary communication device 950 to the cognitive radio communication device 940, and also transmit data to the cognitive radio communication device 940 using the frequency bands which are not used by the primary communication device 950.

Figure 10:
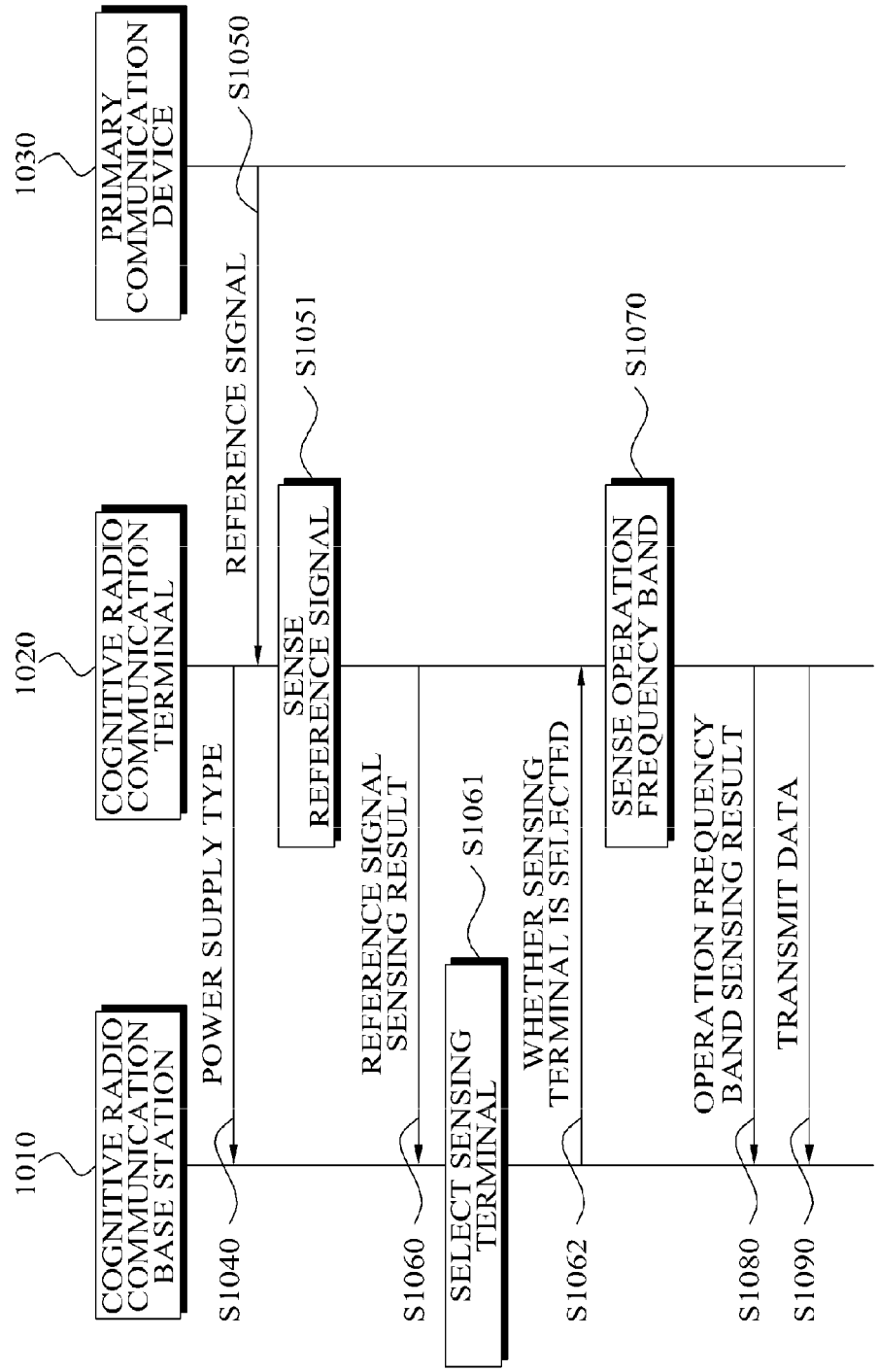
FIG. 10 is a flowchart illustrating a method of determining characteristics of a primary communication device and sensing operating frequency bands of the primary communication device based on the determined result according to an exemplary embodiment.

FIG. 10 is a flowchart illustrating an exemplary method of determining characteristics of a primary communication device and sensing operating frequency bands of the primary communication device based on the determined characteristics.

In operation S1040, a cognitive radio communication terminal 1020 may transmit a power supply type of the cognitive radio communication terminal 1020 to a cognitive radio communication base station 1010. The power supply type may include information about stability of a power with which the cognitive radio communication terminal 1020 is supplied, or information about a sum of the power remaining in a power supply system.

In operation S1050, the cognitive radio communication terminal 1020 may receive reference signals from a primary communication device 1030. The primary communication device 1030 may be assigned with operating frequency bands, and transmit data to a primary terminal using the assigned operating frequency bands. The primary communication device 1030 may transmit the data only using a part of the operating frequency bands during a predetermined period of time depending on characteristics of the data transmitted by the primary communication device 103.

In operation S1051, the cognitive radio communication terminal 1020 may estimate frequency bands used or not used by the primary communication device 1030 from among the operating frequency bands using the reference signals. In operation S1051, the cognitive radio communication terminal 1020 may divide the operating frequency bands into a plurality of sub frequency bands, and measure an energy level with respect to each of the divided plurality of sub frequency bands. When the energy level is more than a predetermined reference value, a corresponding sub frequency band may be estimated as a used frequency band.

In operation S1060, the cognitive radio communication terminal 1020 may transmit a sensed result with respect to the operating frequency bands to a cognitive radio communication base station 1010.

In operation S1061, the cognitive radio communication base station 1010 may select a sensing terminal based on a sensed result of the reference signals and the power supply type of each of the cognitive radio communication terminals 1020. The cognitive radio communication base station 1010 may preferentially select the cognitive radio communication terminal 1020 supplied with a power from a stable power supply system as the sensing terminal.

In operation S1062, the cognitive radio communication base station 1010 may inform the sensing terminal of whether the cognitive radio communication terminal 1020 is selected as the sensing terminal. Hereinafter, it is assumed that the cognitive radio communication terminal 1020 is selected as the sensing terminal 1020.

In operation S1070, the sensing terminal 1020 may sense operating frequency bands. In operation S1070, the sensing terminal 1020 may compare a pattern of the reference signals and a predetermined pilot pattern to accurately estimate whether the primary communication device 1030 uses a specific frequency band.

In operation S1080, the sensing terminal 1020 may transmit, to the cognitive radio communication base station 1010, a sensed result with respect to the operating frequency band generated in operation S1070.

In operation S1090, the sensing terminal 1020 may transmit data to the cognitive radio communication base station 1010 using the frequency band which is not used by the primary communication device 1030.

The methods described above including a cognitive radio communication method may be recorded, stored, or fixed in one or more computer-readable media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

According to certain embodiments described above, a second communication system may determine an optimum frequency sensing band to simultaneously perform frequency sensing and data transmission in a communication environment where a broadband first communication system and a narrowband third communication system are used.

Also, the second communication system may transmit data using frequency bands not used by the first communication system, thereby effectively utilizing frequency bands.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A cognitive radio communication device, comprising:
a reception unit to receive reference signals from a first communication device;
a frequency division unit to divide operating frequency bands of the first communication device into a plurality of sub frequency bands;
a first sensing unit to sense each of the plurality of sub frequency bands using the reference signals to estimate whether the first communication device uses each of the plurality of sub frequency bands, and to determine an unused sub frequency band not used by the first communication device based on the estimated result;
a transmission unit to transmit data to a second communication device using the unused sub frequency band; and
a second sensing unit to re-sense the unused frequency band to determine whether the unused sub frequency band is still an unused sub frequency band while the transmission unit simultaneously transmits data using the unused sub frequency band.

2. The cognitive radio communication device of claim 1, wherein the first sensing unit comprises:
an energy calculation unit to calculate an energy level of the reference signals with respect to each of the plurality of sub frequency bands; and
a threshold energy comparison unit to compare the calculated energy level with a predetermined threshold value,
wherein the first sensing unit estimates whether the first communication device uses each of the plurality of sub frequency bands based on the compared result.

3. The cognitive radio communication device of claim 1, wherein a sub frequency band adjacent to the sub frequency band used by the first communication device is excluded as the unused sub frequency band.

4. The cognitive radio communication device of claim 1, wherein:
the reception unit receives radio environment information associated with the first communication device, and
the frequency division unit divides the operating frequency bands based on the radio environment information.

5. The cognitive radio communication device of claim 1, wherein:
the data includes a plurality of sub data having different priority from each other, and
the transmission unit transmits the data based on the priority of the plurality of sub data.

6. The cognitive radio communication device of claim 1, wherein:
the transmission unit transmits information about the unused sub frequency band to the second communication device, and
the reception unit receives, from the second communication device, data transmitted based on the information about the unused sub frequency band.

7. The cognitive radio communication device of claim 1, wherein the second sensing unit is configured to compare a pattern of the reference signals with a predetermined pilot pattern to re-sense the sub frequency band.

8. A cognitive radio communication method, comprising:
receiving reference signals from a first communication device;
dividing operating frequency bands of the first communication device into a plurality of sub frequency bands;
sensing each of the plurality of sub frequency bands based on the reference signals;
estimating whether the first communication device uses each of the plurality of sub frequency bands based on the sensed result;
determining an unused sub frequency band that is not used by the first communication device; and
transmitting data to a second communication device using the unused sub frequency band and simultaneously re-sensing the unused sub frequency band to determine whether the unused sub frequency band is still an unused sub frequency band.

9. The cognitive radio communication method of claim 8, wherein the sensing comprises:
calculating an energy level of the reference signals with respect to each of the plurality of sub frequency bands; and
comparing the calculated energy level with a predetermined threshold value.

10. The cognitive radio communication method of claim 8, further comprising:
receiving radio environment information associated with the first communication device,
wherein the dividing divides the operating frequency bands based on the radio environment information.

11. The cognitive radio communication method of claim 1, wherein:
the data includes a plurality of sub data having different priority from each other, and
the transmitting transmits the data based on the priority of the plurality of sub data.

12. A computer-readable recording medium storing a program to perform a cognitive radio communication method, comprising instructions to cause a computer to:
receive reference signals from a first communication device;
divide operating frequency bands of the first communication device into a plurality of sub frequency bands;
sense each of the plurality of sub frequency bands based on the reference signals;
estimate whether the first communication device uses each of the plurality of sub frequency bands based on the sensed result;
determine an unused frequency band group including at least one sub frequency band not used by the first communication device; and
transmit data to a second communication device using the sub frequency band included in the unused frequency band group.

13. A cognitive radio communication base station, the base station comprising:
a sensing terminal selection unit to select a sensing terminal to sense operating frequency bands of a primary communication device from among a plurality of terminals connected with the cognitive radio communication base station based on reference signals received from the primary communication device;
a reception unit to receive a sensed result with respect to the operating frequency bands from the sensing terminal; and
a transmission unit to transmit data to the sensing terminal using the operating frequency bands based on the sensed result.

14. The cognitive radio communication base station of claim 13, further comprising:
a used frequency band measuring unit to measure a frequency band utilized by the primary communication device using the reference signals,
wherein the sensing terminal selection unit compares a bandwidth of the used frequency band with a bandwidth of the operating frequency band, and selects the sensing terminal based on the compared result.

15. The cognitive radio communication base station of claim 14, wherein the sensing terminal selection unit selects, as the sensing terminal, terminals located in a specific area of a signal coverage radius of the cognitive radio communication base station.

16. The cognitive radio communication base station of claim 13, wherein:
the reception unit receives, from a reference signal sensing terminal included in the plurality of terminals, a sensed result with respect to the reference signals, and
the sensing terminal selection unit selects the sensing terminal based on a ratio of a number of the reference signal sensing terminals to a number of the plurality of terminals.

17. The cognitive radio communication base station of claim 13, wherein the sensing terminal selection unit selects the sensing terminal based on power supply types of each of the plurality of terminals.

18. A cognitive radio communication terminal connected with a cognitive radio communication base station, the cognitive radio communication terminal comprising:
a transmission unit to transmit a power supply type of the cognitive radio communication terminal to a cognitive radio communication device;
a reception unit to receive information about a sensing terminal selected based on the power supply type; and
a reference signal sensing unit to sense reference signals received from a primary communication device based on the information about the sensing terminal,
wherein the transmission unit transmits data to the cognitive radio communication base station based on a sensed result of the reference signal.

19. The cognitive radio communication terminal of claim 18, wherein:
the reference signal sensing unit estimates a used frequency band used by the primary communication device from among the operating frequency bands of the primary communication device based on the reference signals, and the transmission unit transmits the data using a frequency band excluded from the used frequency band from among the operating frequency bands.

* * * * *